(12) United States Patent (10) Patent No.: US 8,165,109 B2
King et al. (45) Date of Patent: Apr. 24, 2012

(54) METHOD FOR MANAGING THE QUALITY OF ENCRYPTED VOICE OVER IP TO TELEAGENTS

(75) Inventors: Joel W. King, Cary, NC (US); John A. Johnston, Raleigh, NC (US); Steve H. Schubert, Orlando, FL (US)

(73) Assignee: Cisco Technology, Inc., San Jose, CA (US)

( * ) Notice: Subject to any disclaimer, the term of this patent is extended or adjusted under 35 U.S.C. 154(b) by 1277 days.

(21) Appl. No.: 10/985,689

(22) Filed: Nov. 10, 2004

(65) Prior Publication Data

US 2006/0098625 A1 May 11, 2006

(51) Int. Cl.
*H04L 12/66* (2006.01)
*H04L 12/26* (2006.01)
*H04M 3/00* (2006.01)

(52) U.S. Cl. ............... 370/352; 370/252; 379/265.09

(58) Field of Classification Search .......... 370/241–253, 370/352–356, 270, 230; 379/265.01–266.1, 379/266.09, 265.03, 1.01, 265.09; 455/67.11, 455/423, 67.13; 709/223
See application file for complete search history.

(56) References Cited

U.S. PATENT DOCUMENTS

| | | | | |
|---|---|---|---|---|
| 5,073,890 | A * | 12/1991 | Danielsen | 370/270 |
| 6,222,919 | B1 * | 4/2001 | Hollatz et al. | 379/265.12 |
| 6,731,609 | B1 | 5/2004 | Hirni et al. | |
| 7,408,884 | B2 * | 8/2008 | Bauer et al. | 370/252 |
| 7,450,908 | B1 * | 11/2008 | Bilder et al. | 455/67.11 |
| 7,542,761 | B2 * | 6/2009 | Sarkar | 455/423 |
| 2003/0186654 | A1 * | 10/2003 | Shigemura et al. | 455/67.13 |
| 2004/0047302 | A1 | 3/2004 | Dezonno et al. | |
| 2004/0071084 | A1 * | 4/2004 | El-Hennawey et al. | 370/230 |
| 2004/0073641 | A1 * | 4/2004 | Minhazuddin et al. | 709/223 |
| 2004/0151127 | A1 | 8/2004 | Chong | |
| 2005/0025063 | A1 * | 2/2005 | Grovenburg | 370/252 |
| 2005/0047579 | A1 * | 3/2005 | Salame | 379/265.09 |
| 2006/0062373 | A1 * | 3/2006 | Chervets et al. | 379/265.03 |
| 2006/0098625 | A1 | 5/2006 | King et al. | |
| 2006/0153174 | A1 * | 7/2006 | Towns-von Stauber et al. | 370/356 |
| 2006/0203994 | A1 | 9/2006 | Shaffer et al. | |
| 2006/0221941 | A1 | 10/2006 | Kishinsky et al. | |
| 2007/0008894 | A1 * | 1/2007 | Lynch et al. | 370/244 |
| 2007/0019618 | A1 | 1/2007 | Shaffer et al. | |

OTHER PUBLICATIONS

Cisco Systems, Inc. publication entitled "Cisco IOS Service Assurance Agent for Voice Over IP", 1992-2003 for more information http://www.cisco.com/go/saa/.
Cisco Systems, Inc. publication entitled "NetFlow Services and Applications", article can be obtained at http://www.cisco.com/warp/public/cc/pd/iosw/ioft/neflct/tech/napps_wp.htp; pp. 1-15.

(Continued)

*Primary Examiner* — Ahmad Matar
*Assistant Examiner* — Sonia Gay
(74) *Attorney, Agent, or Firm* — Fish & Richardson P.C.

(57) ABSTRACT

A voice over Internet protocol (VoIP) system and more particularly, an improved VoIP system serving a distributed group of teleagents. Network parameters that affect voice quality over broadband connections are rapidly detected by generating both detected and subjective alerts when problems with the quality of a IP telephone connection are detected and correcting the detected problems. Network parameters are monitored during an actual VoIP telephone call or by using synthetic traffic. If the voice quality degrades for a particular teleagent, the teleagent is removed from the pool of available agents until voice quality improves. Alternatively, the voice quality of each teleagent may be ranked according to the service provided.

45 Claims, 5 Drawing Sheets

OTHER PUBLICATIONS

Cisco Systems, Inc. entitled "Network-Based Application Recognition", article can be obtained at http://www.cisco.com/warp/public/cc/so/neso/ienesv/cxne/nbar_ov.htm; pp. 1-9.

Cisco Systems, Inc. entitled "Cisco IOS Service Assurance Agent for Voice Over IP", publication dated 1992-2003, pp. 1-5.

Cisco Systems, Inc. entitled "Using Cisco Service Assurance Agent and Internetwork Performance Monitor Networks", article can be obtained at http://www.cisco.com/en/US/tech/tk648/tk362/technologies_tech_note09186a0080094b26; pp. 1-6.

\* cited by examiner

| Version 502 | Padding 504 | Extension 506 | Padding 504 | CC 506 | M 510 | PT 512 | Sequence 514 |
|---|---|---|---|---|---|---|---|
| Time Stamp 516 ||||||||
| Synchronization Source Identifier 518 ||||||||
| Contributing Source Identifier 520 ||||||||

METHOD FOR MANAGING THE QUALITY OF ENCRYPTED VOICE OVER IP TO TELEAGENTS

BACKGROUND OF THE INVENTION

The present invention relates to a voice over Internet protocol (VoIP) system and more particularly to an improved VoIP system serving a dedicated distributed group of teleagents.

Many companies, governmental agencies and other organizations (collectively "enterprises") are interested in having employees work from home rather than commute to an office each day. Indeed, many enterprises will hire hundreds or thousands of customer service representatives during peak months to handle an expected increase in call volume. For example, a catalog company may hire customer service agents during the holiday shopping season to handle the large volume of telephone sales orders or an insurance company may add agents to process insurance claims after a natural disaster. Clearly, the cost to provide an office for each of these agents would be cost prohibitive but such cost can be avoided if the agents are able to tele-commute. Indeed, as the cost of maintaining office space escalates, enterprises find that tele-commuting, that is, working from a home office rather than commuting to the enterprise's office each day, can generate substantial savings.

With the increased availability of high speed Internet and voice over Internet protocol (VoIP) technology, agents can both access the enterprise's computer systems and communication network as if they were working from the enterprise's office. A home office arrangement provides great benefit for both the enterprise and the agent because the enterprise saves the money it would normally spend on leasing office space and the agent saves the time normally spent commuting. Agents, or employees, working from their home or where ever they may find a broadband connection to the Internet are often referred to as 'teleagents'. Teleagents may include call center agents who answer telephone inquiries for their employer, employees who, while working from home or on the road, support sales, marketing, engineering or manufacturing activities for their employer or business and government employees who are widely deployed in order to provide the ability to respond in the event of a disaster at corporate headquarters.

Many companies supply VoIP technology that can be used by the teleagent. For example, Cisco Systems, Inc. of San Jose, Calif., the assignee of the present application, currently markets voice and video enabled VPN solutions that integrate cost-effective, secure connectivity provided by site-to-site IPSec VPNs for delivering converged voice, video, and data IP networks. These solutions are marketed by Cisco under the name of V3PN and are typically a site-to-site VPN deployment using T1 lines and the Internet so voice quality is similar to that of a toll call. When design guidelines for IPSec over ADSL are followed, a caller cannot hear a difference in voice quality when the IP telephone is connected from the employee home over a broadband connection. IPsec refers to an IP security protocol developed by the Internet Engineering Task Force (IETF), the main standards organization for the Internet, to support secure exchange of packets at the IP layer. IPsec has been deployed widely to implement Virtual Private Networks (VPNs). ADSL refers to Asymmetric Digital Subscriber Lines that are used to deliver high-rate digital data over existing ordinary phone-lines. ADSL facilitates the simultaneous use of normal telephone services and high speed data transmission rates of about 1.5 to 9 megabits per second (Mbps) when receiving data (known as the downstream rate) and from 16 to 640 kilobits per second (Kbps) when sending data (known as the upstream rate).

While the Internet is capable of providing consistent and reliable transport of encrypted voice approaching toll quality, voice quality will vary depending on the Internet Service Provider (ISP) and various network parameters such as loading, network equipment type and age, available bandwidth, the type of equipment used by the teleagent and the like.

Since one purpose of allowing agents to tele-commute is to reduce costs, enterprises need a method to ensure toll quality voice service to teleagents who may be deployed anywhere in the country or even in other countries. Further complicating the effort to ensure toll quality voice service, most of the teleagents have inexpensive basic residential broadband service with limited bandwidth. Indeed, the available bandwidth provides the minimum bandwidth needed to support VoIP and it is not uncommon for such bandwidth to vary over time. Thus, one major obstacle to supporting teleagents is the difficulty in managing the communication network between a large number of teleagents, deployed over a large geographic area and enterprise's computer infrastructure so that customers and suppliers experience a VoIP telephone call that has comparable voice quality to that of a toll call placed over the switched telephone network. What is needed is a method for determining when a teleagent does not have a broadband connection sufficient to meet the voice quality needs of an enterprise.

Another complication facing a network administrator tasked to manage a large deployment of teleagents, arises because not all broadband Internet Service Providers (ISPs) have adequate service level agreements necessary to support both voice and data transmission over a high-speed ADSL connection. Further, not all ISPs have the necessary degree of reliability and availability comparable to that provided by the Internet backbone providers. Indeed, the quality of the connection may vary with a single ISP over time. All of these parameters will affect voice quality and are often times of a transient nature. What is needed is a method for quantifying both subjective and objective determinations of network conditions to determine if voice quality will meet the needs of an enterprise.

Unfortunately, for the network administrator tasked to manage the deployment of teleagents, there is yet another complication in managing deployed teleagents. This complication arises because of the widely varying differences in network quality inside the teleagent's home. Factors such as the age and the type of the cabling in the teleagent's home, their distance from the ISP's demark point, the loading on the network due to use of the ADSL connection by other family members or whether DSL filters are installed and working properly can all negatively impact the quality of the VoIP call. These environmental factors are outside the control the ISP so there must be some mechanism to monitor the call quality for each teleagent depending on their location and identify the source of negative factors that affect voice quality.

It is widely known that there are existing tools that can be used to monitor a communication network. For example, Cisco markets a tool, known as 'Cisco's NetFlow Services', that captures traffic statistics by IP address, protocol, port, and type of service (ToS). It identifies and reports on network flows of packets between a given source and destination. Unfortunately, this tool is not dedicated to providing toll quality voice for teleagents or reporting its information that is readily useable by a network administrator responsible for managing the deployment of teleagents.

Cisco also markets a network-based application recognition (NBAR) classification engine that can recognize a wide variety of applications such as, by way of example, a voice call. Once the application is recognized, NBAR works with quality-of-service (QoS) features to guarantee bandwidth to critical applications, limit bandwidth to other applications or drop selective packets to avoid congestion on the network. Unfortunately, this tool is not dedicated to providing toll quality voice for teleagents or reporting its information that is readily useable by a network administrator responsible for managing the deployment of teleagents.

Yet another Cisco product is commercially available and marketed as Service Assurance Agent (SAA). SAA is an application-aware synthetic operation agent that generates data requesting packets at a specified router. The packets are then transferred back to the initiating router for analysis and reporting. SAA allows routers to measure and report network application round trip times. SAA uses simulated application traffic to routers configured as responders. By taking iterative round trip measurements, it is possible to calculate a variance, which is useful in determining jitter for voice traffic. SAA reports both positive and negative jitter.

Yet another tool marketed by Cisco is the Internetwork Performance Monitor (IPM). The IPM is a network response time and availability troubleshooting application that uses SAA probes enable the network administrator to proactively troubleshoot network-wide performance, diagnose congestion and latency problems utilizing real time and historical statistics. Unfortunately, this tool is not dedicated to providing toll quality voice for teleagents or reporting its information that is readily useable by a network administrator responsible for managing the deployment of teleagents.

While the network measurement and management tools are commercially available, the results generated by these tools are difficult to interpret in a VoIP system. Indeed, while data about certain network parameters may be available, it is not readily possible to correlate measured data to actual voice quality problems. Thus, in addition to the objective measurements provided by network tools, there also needs to be a subjective means for identifying poor voice quality and correlating such objective and subjective information in a manner that is useable by a network administrator in troubleshooting poor voice quality. Accordingly, a simple tool that can monitor the communication network, identify network problems, both objective and subjective, and initiate a method for the network administrator to initiate a corrective action to resolve the problems of poor voice quality would greatly assist a network administrator who was responsible for managing a network of deployed teleagents.

SUMMARY OF EMBODIMENTS OF THE INVENTION

The preceding and other shortcomings of the prior art for managing a voice over Internet protocol (VoIP) system and more particularly to an improved VoIP system serving a dedicated distributed group of teleagents. An embodiment of the present invention provides a method for detecting network parameters that affect voice quality over broadband connections, generating both detected and subjective alerts when problems with the quality of a IP telephone connection are detected and correcting the detected problems.

The present invention provides teleagents and network administrators with a set of tools and processes that enable the rapid assessment and identification of network parameters affecting the quality of a VoIP call over a broadband connection. In one embodiment of the present invention, network parameters are monitored and if voice quality degrades, an alert is generated. Network parameters may be monitored during an actual VoIP telephone call or synthetic traffic may be generated.

The invention is particularly useful if the voice traffic must span multiple providers' networks or where the quality of service will vary widely because of a variation in equipment used by each of the deployed teleagents. An embodiment of the present invention provides a measuring tool, a monitoring tool and a correction response tool that allows either the teleagent or the network administrator to detect a problem with call quality and to initiate a response to correct the poor quality.

An embodiment of the present invention utilizes existing voice quality management tools in a call center environment to allow a teleagent to be removed from the pool of available agents if the teleagent's voice quality is below an acceptable level. In another embodiment, the present invention ranks the voice quality of each teleagent and a real-time ranking of voice quality is used to generate an alarm or provided to a supervisor to allow manual exclusion of the teleagent from the pool of agents. In yet another embodiment, each teleagent can initiate a quality check if they notice a decrease in voice quality. In still yet another embodiment, communication network quality is monitored during a call or if there are no current calls, during a simulated call so that proactive measures can be taken to ensure adequate quality.

Embodiments of the present invention address the difficulty and time involved in equating user perceived voice quality with statistical data for a VoIP call. Accordingly, when a teleagent complains of voice quality problems and dropped calls, network administrators no longer need to spend a considerable amount of time coordinating with the teleagent on how to indicate or notify them for proactive monitoring.

The foregoing and additional features and advantages of this invention will become apparent from the detailed description and review of the associated drawing figures that follow.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
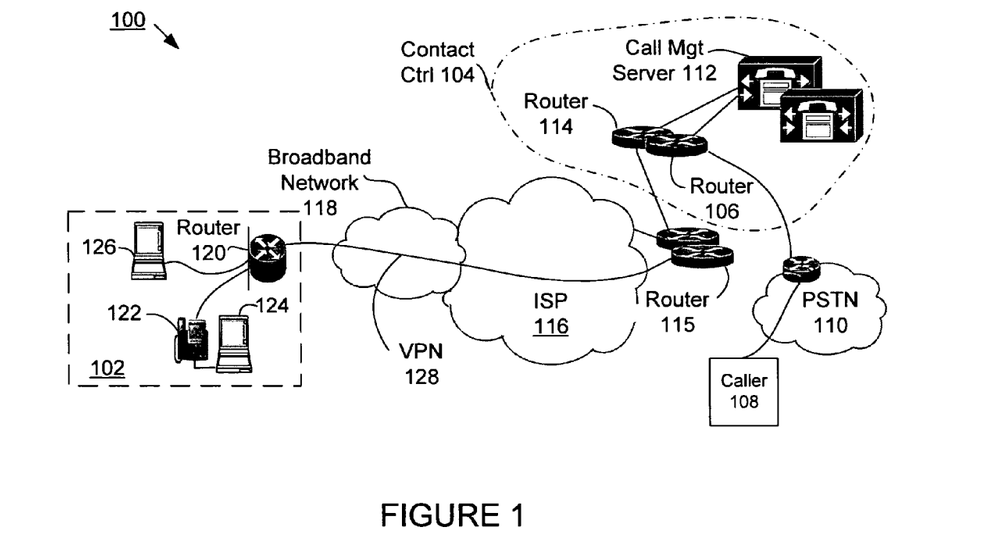
FIG. 1 is a simplified block diagram illustrating one exemplary representative communication network that supports a plurality of teleagents in accordance with an embodiment of the present invention.

Referring now to the drawings more particularly by reference numbers, a simplified embodiment of a representative communication network 100 for supporting a teleagent is shown in FIG. 1. It is to be understood that a network capable of meeting the requirements for transmitting toll quality calls will depend on many factors so the actual configuration of network 100 will likely vary depending on the specific capabilities required for a given application. As such, the network configuration illustrated in FIG. 1 is exemplary in nature.

In FIG. 1, a home office 102 connects with an IP contact center 104 that functions as the main route point for receiving outside calls and for connecting the teleagent with the enterprise's data and communication networks. Center 104 includes a router 106 for receiving outside calls from outside callers 108. A public switched telephone network (often referred to as PSTN or alternatively, the plain old telephone system POTS) 110 delivers outside calls to center 104. PSTN refers to the international telephone network that carries analog calls over copper wires. As used herein, PSTN may include other telephone networks such as ISDN or other digital networks so long as outside callers are connected to router 106.

Center 106 may include certain call management servers 112 that accept incoming calls and converts analog calls to encrypted digital Internet protocol (IP) packets. In other embodiments, such packets may comprise asynchronous transfer mode (ATM) packets or frame relay packets.

Router 114 couples call management servers 112 to the Internet backbone 116, which is operated by an Internet Server Provider (ISP). Intermediate routers or switches, such as WAN router 115, may be selected depending on the selected route path. Digital calls are logged by servers 112 and transferred by router 106 onto the Internet backbone 116. Servers 112 may include and execute a software product marketed by Cisco under the name of the Cisco IP Contact Center ('IPCC'). IPCC is a multi-channel contact management over an IP infrastructure that delivers intelligent call routing and multimedia contact management to teleagents over an IP network.

The Internet backbone 116 transports calls from center 106 to one of a plurality of broadband networks such as is illustrated by a broadband network 118. Broadband network 118 is operated by a broadband service provider and is typically a wide area network (WAN) that serves a local market. Thus, a teleagent in the San Jose, Calif. area may have a different broadband service provider than a teleagent in Sunnyvale, Calif. and different broadband service providers may route calls onto the Internet backbone 116 using different ISPs. Based on the multiple parties involved in carrying a call from center 106 to the teleagent's home 102, it is clear that there is a potential for a wide variation in call quality due to network equipment and loading factors.

The home office 102 is connected to broadband network 118 by a router 120. It is to be understood that a plurality of such home offices may be connected to broadband network 118 and that each home office will include router 120. Each router 120 can couple a plurality of IP devices such as an IP telephone 122 and at least one computer 124 to the broadband network. Either or both of telephone 122 and computer 124 may be connected to router 120 by wire or by a wireless connection. Further, additional computers, such as the computers 126 of other family members, may connect to the Internet through router 120. Router 120 may include an ADSL interface but more typically router 120 is an Ethernet to Ethernet device that terminates the IPSec tunnel and the broadband carrier supplies an ADSL modem or a cable modem.

In operations, a telephone call from outside caller 128 is carried by PSTN 110 to contact center 104 where router 106 either places the call onto the Internet backbone 116 or routes the call to call management server 112 if the call is from the analog network to convert the call to packets and to encrypt the voice traffic. To set up the connection, the remote router establishes a virtual private network (VPN) 128, which provides a secure network connection between control center 104 and home office 102. In one embodiment, the secure network connection comprises an IPSec tunnel, which is an open standard used to provide secure transmission of sensitive information over unprotected networks such as the Internet. IPSec acts at the network layer, protecting and authenticating IP packets between participating IPSec devices ("peers"), such as routers 106 or 114 and 120. The VPN to the head-end tunnel is based on IP traffic either from the IP telephone's registration packets to the Call Manager or PC applications contacting the central site's servers or packets generated by the router (NTP or Network Time Protocol originated from a router inside the IPSec tunnel). With the VPN 128 set up, the teleagent logs into the application for an outside call to be answered by the agent.

With communication network 100, teleagents can work over the IPSec VPN 128 to implement a teleagent deployment. However, a network administrator responsible for implementing and monitoring communication network 100 will have little ability to individually set up and monitor each home office in a deployment consisting of several hundred or several thousands of teleagents. To assist the network administrator, the present invention addresses the fault detection and identifies performance parameters of the communication network 100 most likely to contribute to poor voice quality. More specifically, embodiments of the present invention detects faults and performance parameters at the interfaces between the home office and the broadband network 118 and between the broadband network 118 and Internet backbone 116, with a goal of providing toll quality voice calls for outside callers connected to the teleagents.

Communication network 100 also provides teleagents a data connection to servers located at contact center 104 or elsewhere in the enterprise campus. Teleagents typically require high quality voice since the nature of their work is speaking with the enterprise's customer base but they also typically require access to enterprise information such as catalog copy, product information and other such resources. The challenge facing the enterprise is how to provide these resources cost effectively when the staffing requirements may be seasonal in nature or there is a requirement for specialized skills.

Figure 2:
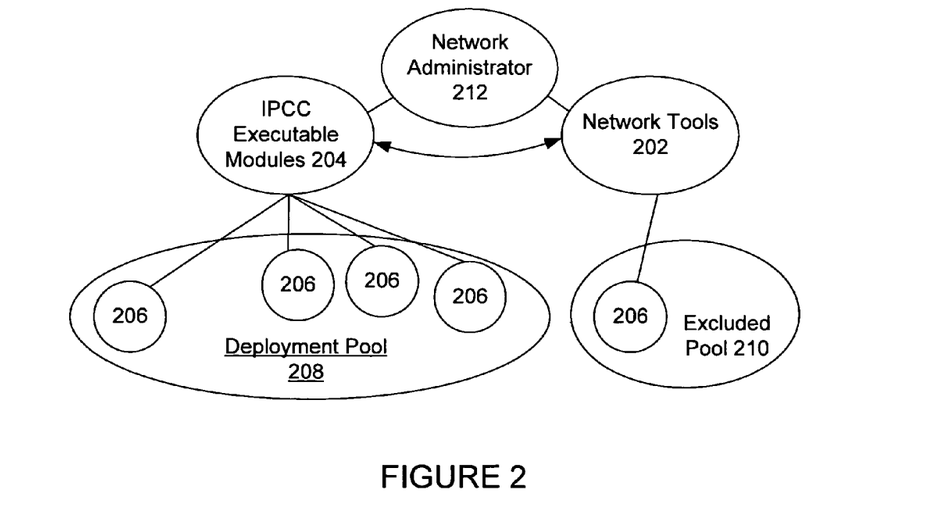
FIG. 2 illustrates an embodiment of the present invention that includes voice quality management tools and call center executable modules.

FIG. 2 illustrates an embodiment of the present invention to manage voice quality for a pool of teleagents. The embodiment includes voice quality management tools 202 and executable modules 204 that provide certain IPCC functions. Tools 202 interface with modules 204 so that if call quality degrades below a selected threshold for one of the managed teleagents 206 in a deployment pool 208, the teleagent is removed from the pool of available teleagents and moved to a problem pool 210. When a teleagent is removed from pool 208 and placed in the problem pool 210, outside calls are not transferred to that teleagent because of the likelihood of poor voice quality. A teleagent 206 will remain in the problem pool 210 until the network problems are corrected after which the teleagent 206 is returned to the pool of available teleagents. In another embodiment, when a teleagent is taken off-line, tools 202 generate synthetic traffic to verify that the problem has been corrected. In another embodiment, the teleagents are ranked in terms of voice quality and the ranking is sent to a network administrator 212 who is able to monitor voice quality and manually exclude a teleagent if quality is below a level of acceptability. This proactive feature enables the network manager to identify teleagents with voice quality problems and remove the agent from the pool of available teleagents and place the teleagent in the excluded pool 210 even if there is not subjective complaints about call quality. This feature is particularly useful in telephone call center applications where a large number of agents field calls from customers and the enterprise does not want a customer routed to an agent likely to experience poor voice quality on their IP telephone.

It has been empirically determined that a caller 108 generally cannot hear a difference in voice quality between an IP phone located at center 106 or connected from the home office 102 using an IPSec tunnel over ADSL. What has been observed, however, is that broadband service providers do not offer a homogeneous service levels so there may be times where the broadband service provider is unable to deliver sufficient bandwidth or error free service. While there is little difference between the service levels of the Tier 1 and Tier 2 ISPs, this is not the case with broadband service providers. A managed broadband service which costs $200-$300 monthly per teleagent may be consistently superior to an unmanaged residential broadband service costing less than about $75 a month. The present invention enables enterprises to take advantage of the low cost unmanaged broadband service while providing toll quality voice.

Figure 3:
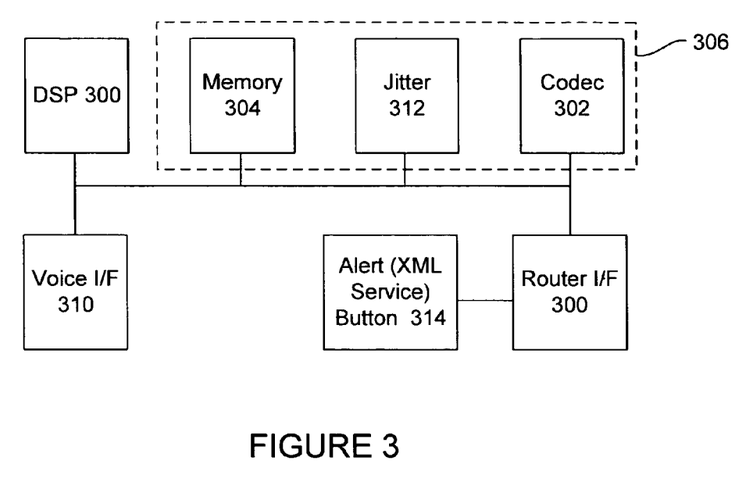
FIG. 3 illustrates a schematic representation of an IP telephone 122 in accordance with an embodiment of the present invention.

Refer now to FIG. 3 where IP telephone 122 is illustrated in schematic form. IP telephone 122 may include a digital signal processor (DSP) 300 and a CODEC 302, which is typically used to transform analog signals into a digital bit stream and digital signals back into analog signals. The DSP may be any commercially available device that is capable of executing operating code stored in memory 304. Together, memory 304 and CODEC 302 comprise memory system 306. The CODEC may be of any particular type and it is to be understood that the bandwidth requirement for carrying voice will vary depending on the type of CODEC chosen. For example, a G.711 CODEC consumes roughly twice the bandwidth as a G.729 CODEC. In one preferred embodiment, on a PPPoE/DSL deployment, DSP 300 will allocate 128K of memory 304 for G.711 and 64K of memory for G.729. The voice quality of G.711 generally is perceived as superior to G.729, which may have a 'tinny' sound. When high voice quality is desired, the higher audio fidelity of G.711 is preferred. Thus, when the higher quality voice CODECs is specified for teleagents, it must be recognized that such CODECs will require a significant portion of the available bandwidth in a typical residential DSL connection.

IP telephone 122 further includes a jitter buffer 312 to receive voice packets from router interface 308. Since voice packets may arrive in any order, jitter buffer 312 adds a small amount of delay during which packets are accumulated and sequentially ordered before being delivered to CODEC 302 to be converted back into human perceptible sound. Jitter buffer 312 may be a software process executing in memory system 306 or it may be a hardware circuit. Further, jitter buffer 312 may be a fixed size or it may expand or contract in response to the jitter rate.

CODEC 302 and voice interface 310 cooperate to deliver human audible sound to the teleagent and to digitize and break up the teleagent's voice into packets for delivery over the network to the caller. When the CODEC 302 transmits digitized voice packets to the router interface 308, the packets are transmitted at a common rate, such as one voice packet every 20 mseconds. Upon receipt of voice packets, the jitter buffer 312 functions to deliver voice packets to CODEC 302 at the rate expected by the CODEC 302, that is at a rate of about one packet every 20 mseconds. It will be appreciated that due to network topology, loading and other factors, some voice packets may have a shorter or a longer transit time relative to other voice packets. The transit time is referred to as latency and jitter is defined as a variation in latency. Unfortunately, as a voice packet traverses the Internet, it is common to have a widely varying latency over time for the packets in a voice stream. This latency causes jitter. Thus, not all voice packets will arrive in the correct order or at an evenly spaced rate. A voice packet may arrive "early" compared to preceding packets (negative jitter) or it may arrive "late" (positive jitter). The effect of jitter is to cause the voice to sound choppy or to cause portions of words to be unrecognizable.

If jitter is present or detectable to the teleagent or the caller, IP telephone 122 includes an alert button 314 that may be activated to send an alert to a network administrator. Thus rather than having to end the call and contact the administrator, the present invention enables the administrator to be notified when the voice quality is degraded. Alert button 314 will continue to function even if circuit quality is not high enough to support voice because the minimum acceptable quality for a short exchange in TCP is much less that required to inform the supervisor of a problem over RTP. Of course, if the circuit has failed completely then the supervisor will be informed through normal network management tool and information supplied by alert button 314 would be redundant. When the alert is received, the monitoring system is activated upon receipt of the alert so that network parameters such as jitter can be measured and logged for later reference. Further, the teleagent may also use alert button 314 as a 'supervisor requested' button.

Figure 4:
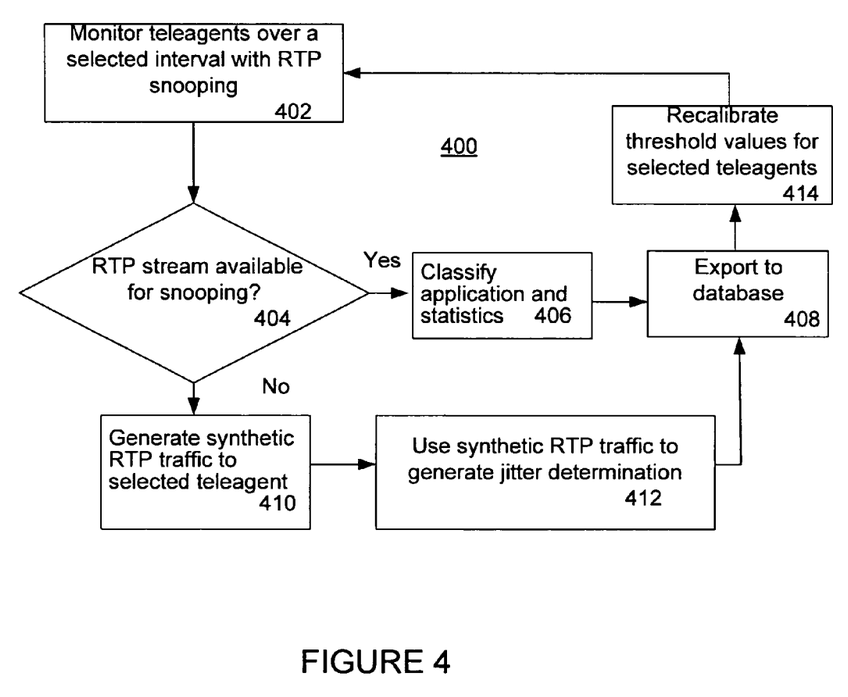
FIG. 4 illustrates a process for monitoring voice quality at a home office in accordance with an embodiment of the present invention.

One purpose of the present invention is to determine whether the amount of jitter exceeds a selected threshold and will affect voice quality. FIG. 4 illustrates a teleagent monitoring processs for monitoring voice quality at each teleagent's home office. More specifically, the monitoring process will determine if the jitter at each teleagent exceeds a threshold, selected by the network administrator that will cause degradation in voice quality.

The monitoring process monitors the Internet connection, that is, router 120, for each teleagent as indicated at step 402. The monitoring process is initiated at selected intervals of time, such as in one embodiment, on an hourly basis. Because a typical deployment may consist of several hundred or possibly several thousand teleagents, it is necessary that the monitoring process be automated to detect only those teleagents that are experiencing network degradation, high jitter and poor voice quality. In accordance with the present invention, a RTP Snooping algorithm is utilized to determine quality without unduly reducing bandwidth available for RTP streams. With RTP snooping, a large number of deployed teleagents are easily monitored during each interval. However, since teleagents are not always engaged in a voice call, it is first necessary to determine if each teleagent has an active call when the RTP snooping is scheduled to begin. Accordingly, at the scheduled time, a service assurance agent (SAA) determines if there are one or two existing RTP streams at the teleagent's home office as indicated at step 404. It will be appreciated that at times, the teleagent may have a supervisor monitoring the call, which is often referred to as endpoint monitoring. In such instances, it is necessary to provision for at least two RTP voice streams. Due to bandwidth required to carry two RTP streams and because of the need for high voice fidelity, it is not possible to concurrently utilize a simulated RTP stream to measure voice quality. Accordingly, if one or more RTP streams are available, SAA will classify, in real time, the application, acquire a time stamp associated with the stream or streams and capture application statistics as indicated at step 406. The information acquired by SAA in step 406 is then exported to a historical database 408.

In the event that no RTP streams are present at the time the RTP snooping is initiated, SAA will generate synthetic traffic that simulates a typical voice call in terms of bandwidth requirements as indicated at step 410. The synthetic traffic may comprise small bursts of simulated voice calls packets that are sent frequently enough to generate meaningful data. With the synthetic RTP stream available, SAA then proceeds to capture application statistics as indicated at step 412. The statistics captured are then stored in the historical database as indicated by the flow proceeding again to step 408. The historical database may include a flag or other indicator that a snooping entry comprises synthetic voice traffic.

When the RTP snooping is complete, a network administrator may recalibrate threshold values for determining when a teleagent will have poor voice quality as indicated at step 414. In a deployment of several thousand teleagents, process 400 is critical to determining when one or more teleagents have network connections that will have unacceptable voice quality. Indeed, it is essential that each teleagent network be monitored to ensure that home office is operating correctly and that calls will be of high quality. Further, it is essential that the monitoring process does not degrade the quality of the call even if there are two or more RTP streams simultaneously active at a home office.

In one embodiment, SAA identifies and classifies RTP flows based on payload attributes and protocol characteristics utilizing NBAR's Layer 3, Layer 4 and packet payload inspection to determine application statistics such as latency, jitter and dropped packets. SAA further utilizes NetFlow routines to ascertain flow characteristics, capacity and network characterization.

In order to generate a meaningful measure of jitter, the present invention measures, at a minimum, both latency and jitter for each teleagent deployed from contact center 104 on a periodic basis. Central to the present invention is the realization that it is not always practical to conduct these measurements at the same time that a voice call is active due to the high bandwidth demands of a voice call and the large number of teleagents.

Figure 5:
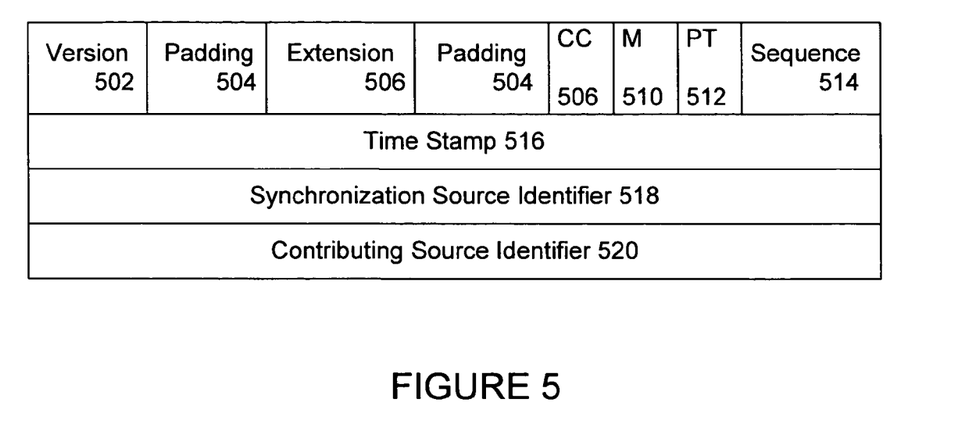
FIG. 5 illustrates a RTP header format for a voice packet in a RTP stream in accordance with an embodiment of the present invention.

FIG. 5 indicates a RTP header format for a voice packet in a RTP stream. The header includes a two bit version field 502 that identifies the version of RTP; a padding field 504 that specifies whether the packet contains trailing padding; an extension field 506 that specifies whether the fixed header is followed by a header extension; a CC field 508 that contains the number of CSRC identifiers that follow the fixed header; a marker field 510 that may be used to denote significant events relating to the packet; a payload type (PT) field 512 that identifies the format of the RTP payload and determines its interpretation by the application; a sequence number 514 that increments by one for each RTP data packet sent and which is used by the receiver to detect packet loss or to maintain proper packet sequence; a time stamp 516 that reflects the sampling instant of the first octet in the RTP data packet and is derived from a clock that increments monotonically and linearly in time to allow synchronization and jitter calculations; a SSRC identifier 518 that identifies the synchronization source; and the CSRC list 520 that identifies the contributing sources for the payload contained in this packet where the number of identifiers is given by the CC field.

By snooping the RTP header, data may be collected regarding packet loss based on the RTP sequence number; positive and negative jitter calculations based on the arrival time and the time stamp, the CODEC in use, the source and destination IP addresses and port number; the number of packets in the stream; the SNMP index of output interface; and the SYSUPTIME of the start and end of flow off the remote router. With RTP snooping the data collected is exported to the database for use by other applications with one important requirement being that SAA must have the capability to snoop on both real and synthetic RTP voice streams and report the same jitter calculation.

SAA generates a plurality of probes, which are distributed over the network. The probes are configured to measure the jitter and latency of each deployed teleagent. The probes consume a minimum of bandwidth and are used proactively alert a network administrator when voice quality issues arise. Table 1 illustrates a sample probe in p-code.

TABLE 1

```
Rtr 18
type jitter dest-ipaddr 10.81.7.1 dest-port 48879 source-port 57007
num-packets 20
                    # Number of packets s/b as low as practical for BW
                    # conservation
request-data-size 16  # Data size is minimum value for BW conservation
tos 32 or 184       # Type of Service parameters; 0x20 DSCP=CS1 or EF
timeout 125
tag DSL_256k-1.4M_JoelK1751
frequency 60        # Default operation frequency (seconds): 60
```

If no RTP streams were encountered during the interval, a reaction configuration initiates a SAA probe to generate synthetic traffic. This does two things, minimizes the amount of synthetic traffic on the network, especially during periods of high call volume, and does not require an actual call to be present to report statistics. This is particularly important if a teleagent has already been taken out of the available pool due to voice quality issues, as the synthetic traffic provides a means to verify the problem has cleared before again routing customer calls to that teleagent.

It is preferred in one embodiment that about 18K should be allocated in the low latency queue of router 120 along with the voice packets for the traffic generated by the probe. SAA probes will also self-calibrate to adjust the threshold for latency and jitter based on the population being sampled. One such p-code example is shown in Table 2 where the first two lines measure jitter and the third line measures latency.

Figure 6:
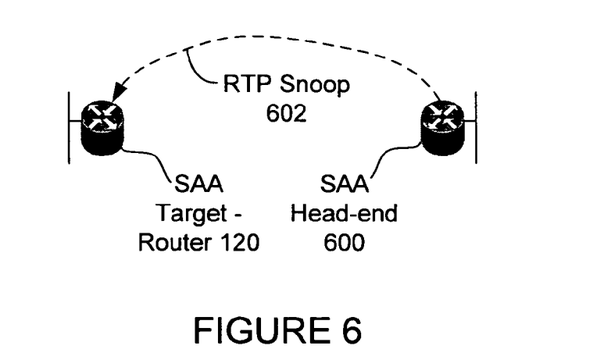
FIG. 6 illustrates the process for monitoring or snooping on voice packets in a network in accordance with an embodiment of the present invention.

TABLE 2 rtr reaction-configuration 18 react jitterDSAvg threshold-value 6 5
   threshold-type immediate action-type trapOnly
rtr reaction-configuration 18 react jitterSDAvg threshold-value 6 5
   threshold-type immediate action-type trapOnly
rtr reaction-configuration 18 react rtt threshold-value 100 99
   threshold-type immediate action-type trapOnly
rtr reaction-configuration 18 react timeout threshold-type immediate
   action-type trapOnly
rtr 18 schedule 18 life 86400 start-time now FIG. 6 illustrates preferred locations for snooping on voice packets. An SAA head-end router 600 instructs a remote router 120, that is the target router, to snoop on all RTP streams sent on interface Ethernet 0. It is preferred that remote router 120 be as close to the receiver as possible. Head-end router 600 may use a 'control enable' instruction to initiate the process at router 120. Router 120 then snoops on packet flow looking for RTP audio streams, such as is illustrated at 602, and responds with port activity. Router 120 initiates the snooping process for a selected duration and at a selected frequency. In one embodiment, it has been determined that router 120 will snoop for about 240 seconds and then terminate if no RTP stream is detected. It has also been found that router 120 should initiate the snooping process about every 600 seconds although other intervals may be selected.

Figure 7:
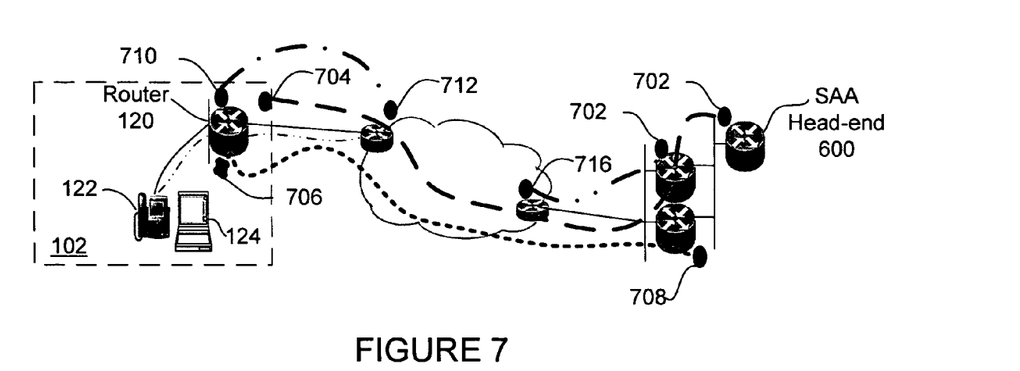
FIG. 7 illustrates the network topology for probe placement when determining the source of a network problem in accordance with an embodiment of the present invention.

When the snooping process identifies a teleagent having voice quality problems, a plurality of probes are activated to identify and localize the source of the problem. By way of illustration, FIG. 7 shows the probe topology. A first probe monitors the route identified by probe point 702 and 704 which defines a route from the SAA head end 600 to router 120 at the teleagent's home office 102. This route encompasses the portion of the network from the outside of the IP Sec tunnel or VPN 128 (see FIG. 1) to the Internet routable IP address at the teleagent's home office 102. Since packets are encrypted on ingress from the Internet, and the monitoring needs to be accomplished as close as possible to the target IP phone 122, which serves as the flow endpoint. It also is important to note that the SAA RTP stream snooping is an egress process while the packets it is snooping on ingress to the home office 102. A second probe monitors the route identified by probe points 706 and 708. This route extends from the inside of the IP Sec tunnel at the home office 102 to the servers 112 at contact center 104. A third probe monitors the route identified by probe points 710 to 712. This route is located at the outside of the IP Sec tunnel at the Internet routable IP address of the home office 102 and extends to the broadband first hop router 714 of the ISP. The first, second and third probes are each independently configured for each teleagent, preferably at the time the teleagent is initially deployed. A fourth probe monitors the route from probe point 716 to 718. This route extends from the outside of the VPN 128 on the contact center side to the ISP's first hop router 720. Probe 4 may be common to all teleagents sharing the topology of a single ISP and would be common to all such teleagents.

The characteristics of a probe are illustrated in Table 3 where representative p-code segment is shown for a probe having a 10 second frequency; a lifetime of at least one hour and possibly 8 hours; a timeout period of 250 ms; protocol of ICMP Echo; a failure timestamp.

TABLE 3 rtr 9
   type echo protocol iplcmpEcho 68.221.84.118
   timeout 100
   tag dgreeson-vpn_failures
   frequency 10

TABLE 3-continued lives-of-history-kept 1
   buckts-of-history-kept 60
   filter-for-history-failures
   rtr schedule 9 life 604800 start-time now The routable IP address can be gleaned from the remote router's default route and the head-end crypto map entry. Any output would be a record of any failure with the addition of a timestamp. In addition, with this probe topology, other useful information can be gleaned such as the teleagent's router interface error stats, CRC and input errors at router 120. It is notorious that broadband MODEMS and personal firewalls are known to have a high failure rate.

SAA can be quickly and widely deployed and provides as much or more granularity as the other jitter reporting tools. Rather than rely on the head end device generating and responding to packets injected into the Internet solely for the purpose of measuring loss, latency and jitter, the present invention relies on detecting the presence of an RTP flow and snooping on that flow, if available. It is only if no RTP flow is present does the head end need to generate the synthetic traffic.

The SAA RTP snooping process flow enables a head-end SAA router to instruct a remote router (RTR RESPONDER) to snoop on RTP flows seen exiting a specified interface and report back after a specified period of time via the SAA control channel. The head-end router then merges the recovered statistics with what was gathered by the head-end. Given this is configured at the head-end, both the SAA router and the remote router need only be configured as a responder, it makes a very practical implementation on a large deployment of teleagents.

To equate the subjective user perception of voice quality, an XML service on phone 122 is configured with an alert button 314 (see FIG. 3). The purpose of this function is to mark or indicate a call that is having voice quality problems. By correlating the historical database data, the SAA RTP flow snooping with the timing of the alert button 314, the network administrator is provided a means to calibrate a network's latency, voice packet loss and jitter values with voice quality.

If a teleagent detects that voice quality is degrading, they can report that condition to the network administrator. If they are unable to take calls from customers to the network administrator that can be indicated as well. By invoking SAA 400, the network administrator is able to measure jitter and latency while the teleagent is on the line and determine if network conditions are the source of the degradation. The network administrator may then take one of two possible actions. Either the teleagent is either removed from the pool of teleagents or the number of calls routed by the call management servers 112 (FIG. 1) to the teleagent is reduced until the source of the poor voice quality is determined. The network administrator may then locate the source of the problem, take the necessary corrective actions and invoke the synthetic traffic feature of SAA 400 to verify that the problem has corrected. Once corrected, the teleagent can be added back into the pool of teleagents.

Over time, the data contained in the historical database can be used to identify jitter thresholds that will result in call degradation. When the measured jitter exceeds the jitter threshold, an alert is generated so that the problem can be isolated and corrected. For example, it may be necessary for the teleagent to replace router 120, install a new frequency filter or perform some other maintenance to reduce the jitter. In other instances, it may require that the teleagent's broadband service provider be notified and a trouble ticket initiated to correct a problem with their network.

Figure 8:
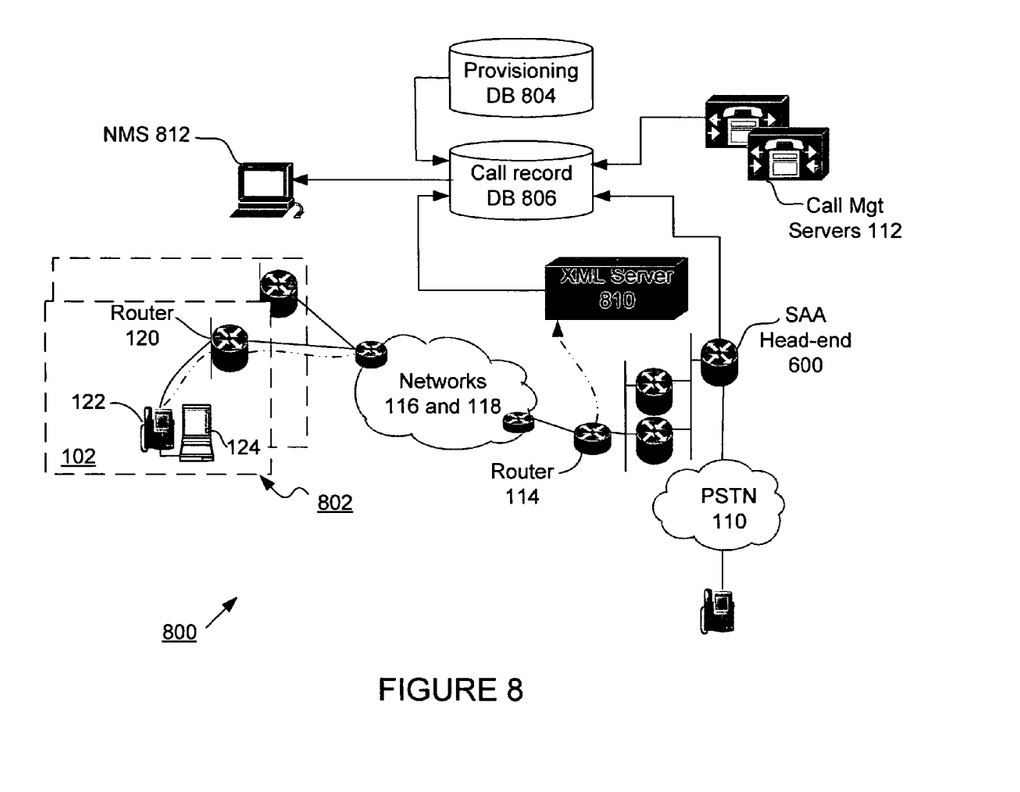
FIG. 8 illustrates another representative embodiment of a communication network that supports a pool of teleagents in accordance with an embodiment of the present invention.

FIG. 8 is another representative embodiment of a communication network 800 for supporting a pool of teleagents although other such network topologies will be evident to those skilled in the art. A typical pool 802 is often used to support a company's customers, accept telephone orders or to enable employees to tele-commute. Although only two teleagents are illustrated in pool 802 it is to be understood that any number of such teleagents and home offices may be set up and deployed.

Central to tracking the deployed teleagents is a provisioning database 804 contains the user population. More specifically, provisioning database 804 identifies the teleagents deployed by the enterprise together with information regarding their ISP, each teleagent's IP address, location, bandwidth, in-home equipment and wiring condition. Other pertinent information may be included in provisioning database 894 as necessary. For large teleagent deployments, provisioning database 804 is preferably constructed using a batch import/update with a seed file representing the teleagent population. Usefulness of this database depends on the entire population being represented and this will not occur if the database requires manual updating. Accordingly, in a preferred embodiment, export of a teleagent list from a voice management contact program such as Cisco's IP contact center software program or a similar application independent flat file is used to seed provisioning database 804. Thereafter, periodic exports are used to keep the database current.

A call record database 806 is maintained by the call manager program, executing on servers 112, which generates a record of each call and stores the record in database 806. The call record database 806 and provisioning database 804 preferably comprise a relational database. Alternatively, the databases 804 and 806 may be separately maintained with the necessary data exported from provisioning database 804 to call record database 806 for each call or as needed.

Statistics relating to the teleagent pool 802 as a whole may be mined to determine when a teleagent is likely to have poor voice quality. Further, when necessary, individual teleagents may be removed from the pool of teleagents as warranted by the network parameters that are indicative of poor voice quality. Further, information from call record database 806 can be used to add or remove teleagents from the pool or rate teleagents in the pool in terms of voice quality with the information exported to call management software such as IPCC.

Communication network 800 further comprises an XML server 810 that is coupled to each deployed teleagent by the broadband connection. XML server 810 monitors for teleagent feedback that indicates a voice quality problem. In one embodiment, a dedicated alert button or a sequence of keys that are pressed on the IP telephone supplies the feedback. The alert button is used by the teleagent to indicate poor voice quality during a call but does not generate an audible tone to detectable to the caller. XML server 810 detects the presence of the alert, creates an alert record, appends a time stamp and forwards the alert record to call record database 806. Alerts are also forwarded to a network administrator management system 812. The network administrator may then activate more proactive monitoring of the teleagent and log events to network management system 812 to isolate the source of the problem.

The enhanced call record database 806 is an important feature aspect of the present invention because the data maintained in the call record database may be mined to identify teleagents having voice quality problems. Specifically, the network administrator or other programs such as IPCC or call management programs may utilize the information in database 806 to rank teleagents in terms of voice quality as reported by the teleagents or as determined from network statistics. Based on the information in the enhanced call record database, teleagents who have been removed from the pool may be re-added to the pool of available agents when conditions have improved, other teleagents may be removed from the pool because of detected poor conditions or segregated from the pool because of the alert notification entered by a teleagent who detects voice quality problems.

By limiting the length of time between a user identifying a problem with voice quality and correlating the teleagent's subjective view with objective network parameters being captured in real time, the network administrator need not spend resources manually attempting to correlate the output of various tools with the problem.

Figure 9:
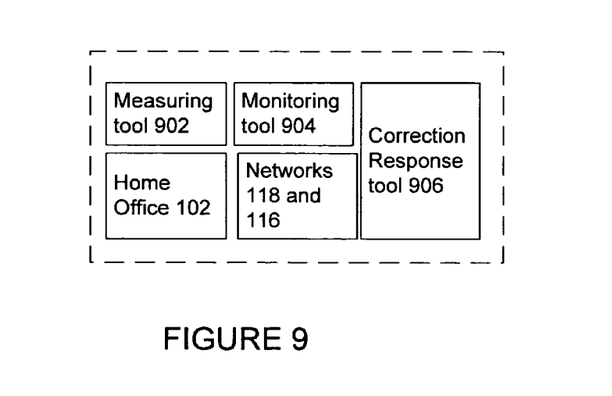
FIG. 9 illustrates another representative embodiment of the present invention.

In one embodiment of the present invention illustrated in FIG. 9, the present invention provides a measuring tool 902, a monitoring tool 904 and a correction response tool 906 that allows either the teleagent at the home office 102 or the network administrator to detect a problem with call quality and to initiate a response to correct the poor quality.

Accordingly, the present invention provides a systematic approach to regularly measuring either actual voice calls with SAA or with SAA generated voice packets for all teleagents. Analyzing this population of users and ranking or calibrating proactive alerts will be possible. It is possible to calculate the standard deviation of jitter to include the entire population of users and provide feedback to the network administrator and to the controlling network management software on what latency, loss and jitter values are abnormal for a deployment and react accordingly. Trending of this data would also be beneficial. The path of an IPSec tunnel over the Internet can change based on ISP peering and routing decisions. It is not uncommon to improve jitter by a difference of 30-60 milliseconds based on ISP changes. Viewing the trends of latency, jitter and loss can alert the network administrator to potential problems before voice quality is negatively impacted.

Although the invention has been described with respect to specific embodiments thereof, these embodiments are merely illustrative, and not restrictive of the invention. For example, the network may include components such as routers, switches, servers and other components that are common in such networks. Further, these components may comprise software algorithms that implement connectivity functions between the network device and other devices.

The executable code described herein may be implemented in any suitable programming language to implement the routines of the present invention including C, C++, Java, assembly language, etc. Different programming techniques can be employed such as procedural or object oriented. The routines can operate in an operating system environment or as standalone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for managing a Voice over Internet Protocol (VoIP) network, the method comprising:

identifying a teleagent deployed in a network for receiving calls from callers, the teleagent being identified by identification of a computer associated with a calling device used by the teleagent at a remote location that is different from a central location of the network;

identifying a router in the network that is geographically located closest to the teleagent calling device from among a plurality of routers in the network;

determining whether the teleagent is receiving an active voice call by observing, using a service assurance agent probe in the router located closest to the teleagent calling device that is routing traffic for the teleagent calling device, that two real-time protocol (RTP) streams are existing at the teleagent calling device, the two RTP streams including a first RTP stream used by a supervisor for monitoring the active voice call and a second RTP stream carrying the active voice call;

based on the determination that the teleagent is receiving the active voice call capturing, using the service assurance agent probe, statistics related to the active voice call and storing the captured statistics in a historical database, the statistics being associated with one or more performance measures of a network connection to the teleagent calling device, the performance measures being selected from a group including information for latency, jitter and dropped packets;

receiving, at a device for a network administrator at the central location, an alert message from the teleagent calling device that indicates that the teleagent calling device is experiencing poor quality of the active voice call, the alert message being activated from the teleagent calling device while the active voice call is in progress by information from an alert button on the teleagent calling device;

correlating, using information from the device of the network administrator, the poor quality of the active voice call experienced by the teleagent calling device with the performance measures of the active voice call based on the captured statistics and the alert message; and removing, using information from the device of the network administrator and in response to the correlation, the teleagent calling device from a set of calling devices associated with a pool of available teleagents for subsequent voice calls on the network, such that the teleagent calling device remains removed from the pool until quality of voice calls at the teleagent calling device is improved by a predetermined threshold amount due to a recalibration, using the device of the network administrator, of threshold values associated with the one or more performance measures, the improvement being verified by generating a synthetic RTP stream, the synthetic RTP stream being is configured to simulate the voice call to the teleagent calling device for capturing the statistics related to the performance measures.

2. The method of claim 1, wherein the correlating further comprises receiving an indication from the teleagent that at least one of selected parameters of the network has subjectively degraded.

3. The method of claim 1, wherein the determining further comprises identifying voice traffic and determining selected parameters of the network when the voice traffic is present.

4. The method of claim 3, further comprising generating synthetic voice traffic and determining said selective parameters of said network.

5. The method of claim 4, further comprising maintaining a historical database of said selected parameters together with an indication of whether said parameters were determined from voice traffic or synthetic voice traffic.

6. The method of claim 1, further comprising ranking one or more teleagents in the pool of available teleagents, and blocking teleagents that are ranked as having poor voice quality from the network until the voice quality for the blocked teleagents has improved.

7. The method of claim 1, wherein determining whether the quality of voice calls has improved comprises generating synthetic voice traffic and determining selective parameters of the network connection to the teleagent calling device.

8. The method of claim 1, further comprising activating an alert button on the teleagent calling device to generate a subjective indication of poor voice quality experienced by the teleagent.

9. The method of claim 8, further comprising transmitting said subjective indication to a network administrator at a network management system.

10. The method of claim 9, further comprising associating said subjective indication with a most recently acquired set of selected parameters.

11. The method of claim 10, further comprising selectively probing network components in said network to determine said selective parameters of said network at each of said network components.

12. A method for monitoring quality of voice service in a Voice over Internet Protocol (VoIP) network deployment, the method comprising:
identifying a teleagent deployed in the network for receiving calls from callers, the teleagent being identified by identification of a computer associated with a calling device used by the teleagent;
determining whether the teleagent is receiving an active call by observing, using a service assurance agent probe in a router closest to the teleagent calling device that is routing traffic for the teleagent calling device, if two RTP (real-time protocol) streams are existing at the teleagent calling device, a first RTP stream used by a supervisor for monitoring the active call and a second RTP stream enabling the active call;
based on the determination that the teleagent is receiving an active voice call, capturing, using the service assurance agent probe, statistics of the active voice call being carried by the second RTP stream and storing the captured statistics in a historical database, the statistics being indicative of one or more performance parameters of the network connection to the teleagent calling device;
based on the determination that the teleagent is not receiving an active voice call, generating a synthetic RTP stream to the teleagent calling device simulating a voice call and capturing, using the service assurance agent probe, statistics of the synthetic RTP stream and storing the captured statistics in a historical database with a flag indicating that the entry corresponds to synthetic RTP stream; and
based on the captured statistics in the historical database, recalibrating, using a network administrator, threshold values associated with the one or more performance measures that are used for determining when the teleagent will have poor quality of a voice call, the performance measures being selected from a group including latency, jitter and dropped packets.

13. The method of claim 12, further comprising ranking each teleagent in a pool of available teleagents in terms of quality of voice service.

14. The method of claim 13, further comprising removing a teleagent identified as experiencing poor quality of voice service from the pool of available teleagents for subsequent calls on the network such that the teleagent remains removed from the pool until the quality of a voice call at the teleagent calling device is improved by a predetermined threshold amount.

15. The method of claim 14, further comprising generating synthetic traffic simulating a voice call to the teleagent calling device to verify the improvement in the quality of voice service by the predetermined threshold amount.

16. The method of claim 12, wherein the service assurance agent probe uses RTP snooping for monitoring the quality of voice service at the teleagent calling device.

17. The method of claim 16, wherein the monitoring further comprises distribution of a plurality of network probes to verify network parameters at intermediate points in the network.

18. A Voice over Internet Protocol (VoIP) network system, comprising:
means for connecting an outside caller to a teleagent working out of a home office using a calling device that is connected to a call center over the VoIP network system using one or more routers, wherein a pool of available teleagents for receiving calls on the VoIP network system includes the teleagent; and
one or more instructions encoded in a non-transitory computer-readable storage medium for execution by a processor, the one or more instructions when executed by the processor operable to:
determine if the teleagent is receiving an active call by observing, using a service assurance agent probe in a router closest to the teleagent calling device that is routing traffic for the teleagent calling device, if two RTP (real-time protocol) streams are existing at the teleagent calling device, the two RTP streams including a first RTP stream used by a supervisor for monitoring the active call and a second RTP stream carrying the active voice call;
based on the determination that the teleagent is receiving an active voice call, using the service assurance agent probe to collect measurements for performance measurements and statistics related to the active voice call and storing the captured statistics in a historical database, the statistics being associated with one or more performance measures of the network connection to the teleagent calling device, the performance measures being selected from a group including latency, jitter and dropped packets;

receive, using a network administrator at a central location that is different from the remote location, an alert message from the teleagent indicating that the teleagent is experiencing poor quality of an active voice call, the alert message being activated by the teleagent while the active voice call is in progress using an alert button on the teleagent calling device;

correlate, using the network administrator, the poor quality of the active voice call experienced by the teleagent with the performance measures of the active voice call based on the statistics and the alert message; and remove, using the network administrator and in response to the correlation, the teleagent from a pool of available teleagents for subsequent voice calls on the network, such that the teleagent remains removed from the pool until the quality of voice calls at the teleagent calling device is improved by a predetermined threshold amount due to a recalibration, using the network administrator, of threshold values associated with the one or more performance measures, the improvement being verified by generating a synthetic RTP stream simulating a voice call to the teleagent calling device that is used for obtaining the statistics related to the performance measures.

19. The system of claim 18, wherein the alert message is generated by the teleagent by using an alert button on said calling device, the alert message comprising a subjective identification of poor voice quality.

20. The system of claim 19, wherein the subjective identification comprises a computer for sending an eXtensible Markup Language (XML) message to a server, the server being adapted to associate the XML message with monitored network parameters.

21. The system of claim 18, further comprising one or more instructions for ranking a plurality of teleagents in the pool of available teleagents in terms of voice quality.

22. The system of claim 21, wherein said ranking is based on at least one network parameter indicative of poor voice quality.

23. The system of claim 21, wherein said ranking is based on an amount of jitter at a router that is physically located nearest to a home office of each of said plurality of teleagents.

24. A system, comprising:
a network to connect a caller to a teleagent calling device of one of a plurality of teleagents working out of a home office using a Voice over Internet Protocol (VoIP) telephone that is connected to a call center over a VoIP network system using a router, wherein a pool of available teleagents for receiving calls on the VoIP network system includes the one teleagent;
a call manager for routing the caller to a selected teleagent calling device of one of the plurality of teleagents, and for generating a call record containing information relating to a voice call;
one or more instructions encoded on non-transitory tangible media for execution by a processor for determining, in real-time, jitter at the router using voice traffic when the voice traffic is present, and by using synthetic traffic simulating a voice call to the teleagent calling device when no voice traffic is present, the one or more instructions are configured to have the processor to associate the jitter determined at the router with the call record;
an alert manager configured to respond to an indication of a poor voice quality that is provided by the teleagent calling device at a time when a call is in progress during which the teleagent experiences the poor voice quality, and configured to remove the teleagent calling device from a set of calling devices associated with the pool of available teleagents for subsequent calls, wherein the alert manager is configured to receive a signal from an alert button associated with the teleagent calling device for indicating a subjective deterioration of voice quality; and
means for isolating a source of the poor voice quality by correlating the indication of the subjective deterioration with the determined jitter, and for subsequently determining the jitter at the router by generating the synthetic traffic until the voice quality is improved to a predetermined threshold, wherein the system is configured to return the teleagent calling device to the calling devices of the pool of available teleagents in response to the voice quality being improved by the predetermined threshold that is verified.

25. The system of claim 24, wherein the means for isolating comprises a plurality of probes distributed through said network, and a software tool for generating synthetic voice traffic, and further comprising:
a second software tool for generating synthetic voice packets that simulate the voice call to the teleagent calling device, and
a third software tool for verifying that the voice quality has been improved by comparing the voice quality to the predetermined threshold.

26. A method of monitoring a quality of a network over which telecommunication calls are transmitted as call packets, the method comprising:
characterizing the network based on whether or not a recent volume of call packets for each link is sufficient to monitor the quality of the network;
receiving at a central location an alert message from a teleagent servicing a voice call using a Voice over Internet Protocol (VoIP) telephone at a remote location on the network that is different from the central location, the alert message being a subjective indication of a quality parameter of the network indicating that the teleagent is experiencing poor quality of the voice call, the alert message being activated by the teleagent while the voice call is in progress using a facility provided on the teleagent calling device;
collecting statistics from an RTP (real-time protocol) stream to the teleagent calling device for an objective determination of a quality parameter of the network by using service assurance agent probes in a router that connects the teleagent calling device to the network, the RTP stream representing either an active call from a caller or simulating a voice call using synthetic RTP packets in the absence of an active call;
monitoring the quality parameter of the network connection to the teleagent calling device based on the subjective indication of call quality and the objective determination of the quality parameter;
based on monitoring the quality parameter, determining a poor signal quality to the teleagent calling device by correlating the objective determination and the subjective indication;

based on a determination of poor signal quality to the teleagent calling device, removing the teleagent calling device from a set of calling devices associated with a pool of available teleagents for servicing subsequent voice calls; and monitoring an improvement in the quality parameter of the network connection to the teleagent calling device by obtaining statistics related to a synthetic RTP stream simulating a voice call to the teleagent calling device to determine when to return the teleagent calling device to the calling devices of the pool of available teleagents.

27. The method of claim 26, wherein the telecommunication call is selected from a voice call and a video conference call.

28. The method of claim 26, wherein the call packets are selected from a group including Internet protocol (IP) packets, asynchronous transfer mode (ATM) packets, and frame relay packets.

29. The method of claim 26, wherein the quality parameter is selected from a group including a jitter parameter, a latency parameter, and a packet loss parameter.

30. The method of claim 26, wherein the network that is characterized is a network for which a user has activated a quality alert.

31. The method of claim 26, further comprising altering routing of calls when the quality parameter exceeds a selected tolerance and when the teleagent calling device is removed from a set of calling devices associated with the pool of available teleagents.

32. A telecommunication system for monitoring the quality of calls transmitted as packets over at least a portion of a call, the telecommunication system comprising:

a telecommunication network configured to convey one or more calls;

a quality monitor configured to characterize the telecommunication network based on whether or not a recent quantity of call packets is sufficient to monitor the quality of the network, the quality monitor receiving a subjective indication of a quality parameter of a network connection to a teleagent servicing a call using a Voice over Internet Protocol (VoIP) telephone, the subjective indication being provided by the teleagent during the call by generating an alert message using a facility on the teleagent calling device and an objective determination of the quality parameter by probing a router connecting the teleagent calling device to the telecommunication network, wherein the teleagent calling device is removed from a set of calling devices associated with a pool of available teleagents for servicing subsequent calls in response to a correlation of the objective determination and the subjective indication; and a network node configured to generate a synthetic stream simulating a voice call to the teleagent calling device, wherein the quality monitor is further configured to monitor a quality parameter of call packets associated with the synthetic stream to determine a time to return the teleagent calling device to the calling devices of the pool of available teleagents.

33. The telecommunication system of claim 32, wherein said call is selected from a voice call and a video conference call.

34. The telecommunication system of claim 32, wherein said call packets are selected from one or more of Internet protocol (IP) packets, asynchronous transfer mode (ATM) packets, and frame relay packets.

35. The telecommunication system of claim 32, wherein said quality parameter is selected from at least one of a jitter parameter, a latency parameter, and a packet loss parameter.

36. The telecommunication system of claim 32, further comprising an end node of said telecommunication network, wherein said end node is configured to activate a quality alert in response to a user command.

37. The telecommunication system of claim 36, wherein said quality monitor is further configured to characterize telecommunication networks for which said quality alert is active.

38. The telecommunication system of claim 32, further comprising a controller configured to alter routing of calls when the quality parameter exceeds a selected tolerance and when the teleagent calling device is removed from the set of calling devices associated with the pool of available teleagents.

39. The telecommunication system of claim 32, further comprising a controller configured to take a particular link out of service when the quality parameter exceeds a selected tolerance and when the teleagent calling device is removed from the set of calling devices associated with the pool of available teleagents.

40. A telecommunication system for monitoring a quality of calls transmitted as packets over at least a portion of each call, the telecommunication system comprising:

means for characterizing whether or not a recent quantity of call packets is sufficient to monitor the quality of a call received by a teleagent using a calling device; and one or more instructions encoded in a non-transitory computer-readable storage medium for execution by a processor, the one or more instructions when executed by the processor cause the processor to:

determine that the recent quantity of call packets meets a threshold by observing, using a probe in a router connecting the teleagent calling device, that two real-time protocol (RTP) streams are existing at the teleagent calling device, the two RTP streams including a first RTP stream used for monitoring the call and a second RTP stream carrying the call;

monitor a quality parameter of a call packet associated with the call for which the recent quantity at least meets the threshold, the monitoring comprising a subjective indication of the quality parameter based on an alert provided by the teleagent during the call, the monitoring further comprising an objective determination of the quality parameter by probing the router connecting the teleagent calling device, the monitoring comprising information for a correlation of objective information and subjective information, wherein the teleagent is removed from a pool of available teleagents for servicing subsequent calls in response to the correlation of the objective determination and the subjective indication;

based on removing the teleagent from the pool of available teleagents, generate a synthetic stream simulating a call to the teleagent calling device; and monitor the quality parameter of call packets associated with the synthetic stream to determine a time to return the teleagent to the pool of available teleagents.

41. The telecommunication system of claim 40, further comprising one or more instructions that when executed by the processor cause the processor to activate a quality alert in response to a command from a user of the telecommunication system.

42. A method for managing a Voice over Internet Protocol (VoIP) network, the method comprising:

identifying a teleagent deployed in a network for receiving calls from callers, the teleagent being identified by identification of a computer associated with a calling device used by the teleagent at a remote location;

capturing, using a service assurance agent probe, statistics from an RTP (real-time protocol) stream to the teleagent calling device and storing the captured statistics in a historical database, the statistics being associated with one or more performance measures of a network connection to the teleagent calling device, the RTP stream representing either an active call from a caller or simulating a voice call using synthetic RTP packets in the absence of an active call;

receiving, using a network administrator at a central location that is different from the remote location, an alert message from the teleagent indicating that the teleagent is experiencing poor quality of an active voice call, the alert message being generated by the teleagent using the teleagent calling device while the active voice call is in progress;

correlating, using the network administrator, the poor quality experienced by the teleagent with the performance measures of the active voice call based on the captured statistics and the alert message; and removing, using the network administrator and in response to the correlation, the teleagent from a pool of available teleagents for subsequent voice calls on the network, such that the teleagent remains removed from the pool until the quality of voice calls at the teleagent calling device is improved by a predetermined threshold amount due to a recalibration, using the network administrator, of threshold values associated with the one or more performance measures, the improvement being verified by measuring statistics for a synthetic RTP stream simulating a voice call to the teleagent calling device.

43. An apparatus, comprising:
a processor; and
one or more instructions encoded in a non-transitory computer-readable storage medium for execution by the processor, the one or more instructions when executed by the processor cause the processor to:
  identify a teleagent deployed in a network for receiving calls from callers, the teleagent being identified by identification of a computer associated with a calling device used by the teleagent at a remote location;
  determine if the teleagent is receiving an active call by observing, using a service assurance agent probe in a router closest to the teleagent calling device that is routing traffic for the teleagent calling device, if two RTP (real-time protocol) streams are existing at the teleagent calling device, the two RTP streams including a first RTP stream used by a supervisor for monitoring the active call and a second RTP stream carrying the active voice call;
  based on the determination that the teleagent is receiving an active voice call capture, using the service assurance agent probe, collecting measurements for performance measurements and statistics related to the active voice call and storing the captured statistics in a historical database, the statistics being associated with one or more performance measures of the network connection to the teleagent calling device, the performance measures being selected from a group including latency, jitter and dropped packets;
  receive, using a network administrator at a central location that is different from the remote location, an alert message from the teleagent indicating that the teleagent is experiencing poor quality of an active voice call, the alert message being activated by the teleagent while the active voice call is in progress using an alert button on the teleagent calling device;
  correlate, using the network administrator, the poor quality of the active voice call experienced by the teleagent with the performance measures of the active voice call based on the captured statistics and the alert message; and
  remove, using the network administrator and in response to the correlation, the teleagent from a pool of available teleagents for subsequent voice calls on the network, such that the teleagent remains removed from the pool until the quality of voice calls at the teleagent calling device is improved by a predetermined threshold amount due to a recalibration, using the network administrator, of threshold values associated with the one or more performance measures, the improvement being verified by generating a synthetic RTP stream simulating a voice call to the teleagent calling device that is used for capturing statistics related to the performance measures.

44. A method for managing a Voice over Internet Protocol (VoIP) network, the method comprising:
identifying a teleagent deployed in a network for receiving calls from callers, the teleagent being identified by identification of a computer associated with a Voice over Internet Protocol (VoIP) telephone used by the teleagent at a location that is remote from a main location of the network;

determining a router in the network that is geographically located closest to the teleagent's VoIP telephone from among a plurality of routers in the network;

determining whether the teleagent is receiving an active voice call by observing, using a service assurance agent probe in the router located closest to the teleagent's VoIP telephone that is routing traffic for the teleagent's VoIP telephone, that two real-time protocol (RTP) streams are at the teleagent's VoIP telephone, the two RTP streams including a first RTP stream for a supervisor for monitoring the active voice call and a second RTP stream carrying the active voice call;

based on the determination that the teleagent is receiving the active voice call capturing, using the service assurance agent probe, statistics related to the active voice call and storing the captured statistics in a database, the statistics being associated with one or more performance measures of a network connection to the teleagent's VoIP telephone, the performance measures being selected from a group including information for latency, jitter and dropped packets;

receiving, at a device for a network administrator at the main location, an alert message from the teleagent's VoIP telephone indicating that the teleagent's VoIP telephone is experiencing poor quality of the active voice call, the alert message being activated from the teleagent's VOIP telephone while the active voice call is in progress by using an alert button on the teleagent's VoIP telephone;

correlating, using information from the device of the network administrator, the poor quality of the active voice call experienced by the teleagent's VoIP telephone with the performance measures of the active voice call based on the captured statistics and the alert message; and removing, using information from the device of the network administrator and in response to the correlation, the teleagent's VoIP telephone from a set of VoIP telephones associated with a pool of available teleagents for subsequent voice calls on the network, such that the teleagent's VoIP telephone remains removed from the set of VoIP telephones associated with the pool until the quality of voice calls at the teleagent's VoIP telephone is improved by a predetermined threshold amount due to a recalibration, using the device of the network administrator, of threshold values associated with the one or more performance measures, the improvement being verified by generating a synthetic RTP stream, the synthetic RTP stream being is configured to simulate the voice call to the teleagent's VoIP telephone for capturing the statistics related to the performance measures.

45. A method for managing a Voice over Internet Protocol (VoIP) network, the method comprising:

identifying a teleagent deployed in a network for receiving calls from callers, the teleagent being identified by identification of a computer associated with a Voice over Internet Protocol (VoIP) telephone used by the teleagent at a location that is remote from a main location of the network;

capturing, using a service assurance agent probe, statistics from a real-time protocol (RTP) stream related to an active voice call and storing the captured statistics in a database, the statistics being associated with one or more performance measures of a network connection to the teleagent's VoIP telephone, the RTP stream representing the active voice call from a caller or, in the absence of the active voice call, the RTP stream representing a simulation of the active voice call by using synthetic RTP packets;

receiving, at a device for a network administrator at the main location, an alert message from the teleagent's VoIP telephone indicating that the teleagent's VoIP telephone is experiencing poor quality of the active voice call, the alert message being activated from the teleagent's VOIP telephone while the active voice call is in progress;

correlating, using information from the device of the network administrator, the poor quality of the active voice call experienced by the teleagent's VoIP telephone with the performance measures of the active voice call based on the captured statistics and the alert message;

removing, using information from the device of the network administrator and in response to the correlation, the teleagent's VoIP telephone from a set of VoIP telephones.

* * * * *